United States Patent [19]
Winner

[11] Patent Number: 5,996,721
[45] Date of Patent: Dec. 7, 1999

[54] STEERING WHEEL AND AIR BAG PROTECTION DEVICE

[75] Inventor: Kevin D. Winner, Hermitage, Pa.

[73] Assignee: Winner International Royalty LLC, Sharon, Pa.

[21] Appl. No.: 09/017,287

[22] Filed: Feb. 2, 1998

[51] Int. Cl.[6] .................................................. B60R 25/02
[52] U.S. Cl. ............................................ 180/287; 70/209
[58] Field of Search .................................. 180/287–289; 70/209–211, 226, 207; 280/728.1

[56] References Cited

U.S. PATENT DOCUMENTS

| | | |
|---|---|---|
| D. 289,491 | 4/1987 | Johnson . |
| D. 306,252 | 2/1990 | Johnson . |
| 475,305 | 5/1892 | Follett . |
| 1,044,387 | 11/1912 | Hodge . |
| 1,142,780 | 6/1915 | Younger . |
| 1,154,389 | 9/1915 | Fogalsang . |
| 1,168,146 | 1/1916 | Barnes . |
| 1,329,913 | 2/1920 | McGuire . |
| 1,368,054 | 2/1921 | Recher . |
| 1,388,691 | 8/1921 | Bergen . |
| 1,395,532 | 11/1921 | Tilden . |
| 2,458,002 | 10/1949 | Kaskouras . |
| 2,491,609 | 2/1949 | George . |
| 2,662,961 | 8/1953 | Sargent . |
| 3,274,851 | 9/1966 | Geller . |
| 3,982,602 | 9/1976 | Gorman . |
| 4,166,400 | 9/1979 | Manning et al. . |
| 4,186,576 | 2/1980 | Means et al. . |
| 4,327,601 | 5/1982 | Vivian, Jr. . |
| 4,413,490 | 11/1983 | Nielsen, Jr. . |
| 4,738,127 | 4/1988 | Johnson . |
| 4,777,811 | 10/1988 | Binkley et al. . |
| 4,800,775 | 1/1989 | Luchi . |
| 4,856,308 | 8/1989 | Johnson . |
| 4,935,047 | 6/1990 | Wu . |
| 4,961,331 | 10/1990 | Winner . |
| 5,007,259 | 4/1991 | Mellard . |
| 5,031,429 | 7/1991 | Wang . |
| 5,115,652 | 5/1992 | Starmer . |
| 5,199,284 | 4/1993 | Lin ............................................ 70/209 |
| 5,275,030 | 1/1994 | Cole . |
| 5,297,406 | 3/1994 | Lin . |
| 5,353,614 | 10/1994 | Anderson ................................. 70/209 |
| 5,381,679 | 1/1995 | Cummins . |
| 5,415,018 | 5/1995 | Ferrante . |
| 5,431,033 | 7/1995 | Barrett . |
| 5,450,736 | 9/1995 | Volkmar . |
| 5,454,240 | 10/1995 | Whitney . |

(List continued on next page.)

FOREIGN PATENT DOCUMENTS

| | | |
|---|---|---|
| 562201 | 1/1983 | Australia . |
| 919367 | 11/1946 | France . |
| 2501134 | 3/1981 | France . |
| 2487275 | 1/1982 | France . |
| 2580243 | 10/1986 | France . |
| 389215 | 1/1924 | Germany . |
| 684481 | 11/1939 | Germany . |
| 2718291 | 10/1978 | Germany . |
| 584555 | 10/1958 | Italy . |
| 142638 | 9/1990 | Japan . |
| 228807 | 2/1994 | Japan . |
| 361686 | 11/1931 | United Kingdom . |
| 2110175 | 6/1983 | United Kingdom . |
| 2206552 | 1/1989 | United Kingdom . |
| PCT/AU91/ 00415 | 9/1991 | WIPO . |

OTHER PUBLICATIONS

Box Container of "The Cap" by Etc'Cessories. Dec. 1991.

*Primary Examiner*—Christopher P. Ellis
*Attorney, Agent, or Firm*—Vickers, Daniel & Young

[57] ABSTRACT

A motor vehicle security device for protecting against the cutting of an automobile steering wheel which includes a protective member made of cut-resistant material for covering the steering wheel rim and a connector for attaching the protective member to the steering wheel rim. The protective member radially and circumferentially overlies the steering wheel rim to limit access to the rim and protect against cutting of the rim. The protective member is collapsible for convenient storage.

64 Claims, 4 Drawing Sheets

U.S. PATENT DOCUMENTS

| | | |
|---|---|---|
| 5,454,243 | 10/1995 | Impastato . |
| 5,537,847 | 7/1996 | Dalton et al. .............................. 70/209 |
| 5,540,067 | 7/1996 | Kim ........................................... 70/209 |
| 5,548,983 | 8/1996 | Hart . |
| 5,613,383 | 3/1997 | Banez . |
| 5,619,873 | 4/1997 | Wood . |
| 5,676,001 | 10/1997 | Ho ............................................ 70/209 |
| 5,782,116 | 7/1998 | Ryan et al. ............................... 70/209 |
| 5,816,082 | 10/1998 | Gabrielyan ............................... 70/209 |
| 5,842,360 | 12/1998 | Somerfield ............................... 70/209 |
| 5,868,016 | 2/1999 | Duran, Sr. ................................ 70/209 |

STEERING WHEEL AND AIR BAG PROTECTION DEVICE

The present invention relates to the art of anti-theft devices for motor vehicles and, more particularly, to a vehicle security device which protects against unauthorized operation and theft of the vehicle by limiting access to the steering wheel.

BACKGROUND OF THE INVENTION

Over the past several years, there has been a growing demand by vehicle owners to better secure their vehicles against theft. Factors such as inconveniences and insurance premiums associated with the theft of a vehicle or vehicle components have resulted in a demand for mechanisms to better secure a vehicle. In an effort to solve these security problems and demands, a substantial industry has been developed to manufacture and promote various mechanisms which deter theft of a vehicle. Common vehicle security mechanisms include electronic devices such as alarms and so called "killer" switches which disable the engine and/or ignition of a vehicle unless bypassed by the authorized operator. Mechanical devices such as steering wheel locks, which inhibit unauthorized operation of the vehicle by constraining the steering wheel against rotation when locked in position, are also available. However, all these vehicle security systems suffer from numerous disadvantages in terms of cost, convenience and effectiveness.

Electronic alarms for motor vehicles have become well known in recent years and also have many disadvantages associated with their use. Such alarms are designed to be highly sensitive to physical force and/or motion and activate the alarm when the vehicle is disturbed in any way. Consequently, such alarms are frequently activated accidentally by parking lot and service station attendants and/or the owners themselves who neglect to deactivate the alarm system. The electronic alarms are also prone to malfunction and tend to drain the battery of the vehicle. Finally, many of these electronic alarms require professional installation, which is of high cost to a purchaser.

So called "killer" switches have also become popular in recent years. These switches serve to disable the vehicle usually at the ignition system, unless the authorized operator deactivates the killer switch. These types of systems are very costly and suffer from the usual reliability problems associated with electronic devices installed in a motor vehicle. In addition, these devices require professional retailers to install the device after the vehicle leaves the manufacturing plant for a substantial labor charge, since many of these systems are too complex for the general public to self-assemble. In addition, due to the complexity of these systems, a typical motorist is not knowledgeable regarding the deactivation of the system in case of a malfunction.

Vehicle security systems also include mechanical anti-theft devices which restrain relative movement of various components within the vehicle such as a steering wheel, gas pedal, clutch or brake. Many of these mechanical designs include mechanical locks comprising a pair of hooks at opposite ends of an elongated locking apparatus whereby the hooks are engaged to the steering wheel rim or the steering wheel rim and another component within the vehicle. These mechanical locks provide vehicle security without the cost and complexity of electronic security systems and further provide the convenience of being usable selectively at the discretion of the motorist, as opposed to being an ever present fixture of the vehicle which must inconveniently be attended to every time the vehicle is operated. Nevertheless, mechanical locks positioned on the steering wheel or on the steering wheel and another component of the vehicle suffer from various short comings which essentially reduce their effectiveness. The hooks and locks are typically made of hardened steel which resists bending, cutting or prying. While the mechanical locks themselves are relatively indestructible and unremovable by a thief, a thief can bypass such a security system by cutting through the steering wheel rim and removing the mechanical security device. A reinforced steering wheel, which resists being cut, can be installed; however, such steering wheel systems require professional installation and can be very expensive. Also, certain vehicles are equipped with specially designed steering wheels that include various features, such as air bags, light switches and cruise control switches. These specially designed steering wheels cannot be replaced by a generic reinforced steering wheel. Further, these specially designed steering wheels have also become susceptible to theft. The growing demand for air bags has created a market for air bags and air bag parts. As a result, thieves are illegally removing the air bag and various air bag components from vehicles. Many types of mechanical locks are not designed to protect vandalism and/or theft of components of steering wheels.

In light of the deficiencies of many types of mechanical locks and the perceived deficiencies of other types of mechanical locks, a new line of products has been developed which are designed to limit access to a steering wheel and an airbag. One such product is applicants security device sold under the trademark THE SHIELD. This security device is designed to be used in conjunction with a mechanical steering wheel loch such as the steering wheel lock sold under the trademark THE CLUB. THE SHIELD product includes two plate sections which are rotatably connected together so that the plate sections can be moved between an open and collapsed position. Each plate section includes at least one opening which is designed to receive a hook form a mechanical steering wheel lock to thereby secure THE SHIELD product to the steering wheel. THE SHIELD product is designed to cover at least a portion of the region of the steering wheel which contains the air bag. THE SHIELD product also limits access to the steering wheel rim to significantly increase the difficultly in cutting the steering wheel rim. Another security product designed to protect airbags is a security product sold under the trademark ROBOCAP. The ROBOCAP product is a modification of the security device disclosed in U.S. Pat. No. 5,540,067. The ROBOCAP product is a semi-circular device that is fitted onto a portion of a steering wheel and includes a rod-like member that is inserted into the face of the device to secure the device to the rim of a steering wheel. Although both of these products provide additional protection to the airbag and further limit access to the steering wheel rim, both products suffer from the inconvenience of having multiple parts. In addition, the ROBOCAP product also requires the operator to place position the steering wheel in a certain position and installing the ROBOCAP product on a specific region of the steering wheel so that the rod-like member can be properly inserted to secure the security device on the steering wheel and not damage the dash or other components of the vehicle during installation.

The prior art is thus seen to fail to provide a vehicle security device which is economical, simple, and convenient to use and yet which is thoroughly effective in preventing theft of a vehicle and vandalism to a steering wheel.

SUMMARY OF THE INVENTION

The present invention overcomes the above described disadvantages and others and provides a vehicle security device which is inexpensive, convenient and effective in protecting against theft of a motor vehicle.

In accordance with the principal feature of the present invention, there is provided a vehicle security device for limiting access to a steering wheel. The steering wheel includes a rim having a front face and a back face, an inner edge and an outer edge and an inner edge radius and an outer edge radius. The security device designed to limit the access to the steering wheel includes a face plate and an elongated member. The face plate is designed to cover a portion of the steering wheel rim and a portion of the area of the steering wheel which contains the airbag. Preferably, the face plate is substantially semi-circular in shape and covers at least about 25 to about 75 percent of the front face of the steering wheel; however, the face plate may have other shapes and can be designed to cover more than 75 percent of the front face of the steering wheel. The face plate is preferably made of a cut resistant material to resist unauthorized users from gaining access to the steering wheel. Preferably, the cut resistant material is a metallic metal such as steel, steel alloys or other metal alloy. The metallic material may be hardened to further resist cutting. The face plate is preferably coated with a non-abrasive material such as rubber or plastic to inhibit the oxidation of the metallic material and to reduce or prevent damage to the steering wheel or vehicle when the security device is inserted and removed from the steering wheel. The elongated member is preferably included with the security device and is designed to prevent full rotation of said steering wheel when the face plate is positioned on the steering wheel. The elongated member is preferably attached to the face plate. Preferably, the elongated member is attached so it can move with respect to the face plate; however, the elongated member can be secured in a single position relative to the face plate. Preferably, the elongated member is movable between an extended position and a retracted position. Preferably, the fully extended position of the elongated member prevents full rotation of the steering wheel; however, the elongated member can be designed to prevent full rotation in other movable positions. If the elongated member is movable, the elongated member is preferably attached to the face plate so that the elongated member cannot be detached from the face plate. The elongated member may have a variety of shapes. Preferably, the elongated portion of the elongated member has a cross sectional shape which is polygonal (i.e. square, rectangular) or circular. The elongated member is preferably made of the cut resistant metallic material such as steel, steel alloys or other metal alloy. The metallic material may be hardened to further resist cutting. The elongated member may be coated a non-abrasive material such as rubber or plastic to inhibit the oxidation of the metallic material and to reduce or prevent damage to the steering wheel or vehicle when the security device is inserted and removed from the steering wheel. A guide for the elongated member is preferably incorporated on the face plate to maintain the elongated member in a desired position relative to the face plate. The guide also functions regulate the position of the elongated member when the elongated member is designed to be movable between an extended and retracted position. The guide is preferably made of the cut resistant metallic material such as steel, steel alloys or other metal alloy. The metallic material may be hardened to further resist cutting.

In accordance with another aspect of the present invention, the face plate includes two legs having a first and second end and an outer arc of a given radius connected between the first end of each of the two legs. The arc between the two legs forms an outer peripheral edge of the face plate. The face plate is preferably substantially semi-circular and the angle between the legs is preferably selected to be substantially about 180°; however, the angle between the two legs may be greater or less than 180° for a different shaped face plate. The radius of the outer arc between the two legs is preferably selected to be at least equal to and preferably greater than the outer edge radius of the steering wheel rim. The end of the legs may be rounded to eliminate sharp edges on the face plate that could scratch the steering wheel and/or other components of the vehicle.

In accordance with yet another aspect of the present invention, the face plate includes a flange attached to at least a portion of the outer peripheral edge of the face plate. The flange preferably extends outward from the peripheral edge to further limit access to the steering wheel rim. Furthermore, the flange is preferably attached to substantially the entire outer peripheral edge of the face plate. The flange can take on many designs and is preferably circular in shape to provide protection to the outer edge of the steering wheel rim and can also be shaped to protect the outer edge and back face of the rim. The flange is preferably shaped to extend at least partially about a back face of said steering wheel rim when said face plate is positioned on said steering wheel. The flange is preferably made of the cut resistant metallic material such as steel, steel alloys or other metal alloy. The metallic material may be hardened to further resist cutting.

In accordance with still yet another aspect of the present invention, the guide includes a flange, a member to telescopically receive the elongated member and/or groove which is adapted to receive at least a portion of the elongated member. If the guide includes a member for telescopically receiving the elongated member, the member for telescopically receiving preferably has an opening for the elongated member that has a cross sectional shape which is similar to the cross sectional shape of the elongated member; however, the member may have other cross sectional shapes. The member can be designed to extend above, even to or below the top plane of the face plate. If the guide includes a flange, the flange is designed to retain the elongated member in position relative to the face plate. Multiple flanges may be used. The flange can be designed to extend above, even or below the top plane of the face plate. If the guide includes a groove, the groove is designed to retain the elongated member in position relative to the face plate. The groove may take on a variety of shapes. Preferably the groove is shaped to closely match the cross sectional shape of the elongated member. The groove can be designed to extend above, even or below the top plane of the face plate. For movable elongated members, the groove is preferably designed to allow the elongated member to move easily along the guide member. The groove preferably includes a groove flange to retain at least a portion of said elongated member in the groove. The groove flange preferably extends at least partially over the groove. The flange groove also preferably extends at least partially along the groove. If groove flanges are used, preferably at least two flanges are used wherein one flange being positioned on one side of the groove and the other flange being positioned on the other side of the groove. The groove and/or the member for telescopically receiving the elongated member preferably lie in a plane substantially parallel to the plate plane. The member for telescopically receiving the elongated member, the flange and/or the groove are preferably positioned so that the elongated member moves and/or is positioned substantially parallel to the plate plane; however, the elongated member may be positioned and/or move in other planes. The member for telescopically receiving the elongated member, the flange and/or the groove may be coated to a reduced friction substance to facilitate in the ease of movement of the elongated member. The member for telescopically receiving the elongated member, the flange and/or the groove may also include bearings such as slide or roller bearings to facilitate in the sliding of the elongated member.

In accordance with another aspect of the present invention, the elongated member includes a securing leg adapted to secure said face plate to said steering wheel. The securing leg is preferably rigidly attached to the elongated portion of the elongated member; however, other attachment arrangements for the securing leg to the elongated portion may be used. If the elongated member is movable between an extended and retracted position, the securing leg is preferably rigidly attached to the elongated portion. If the elongated member is not movable between an extended and retracted position, the securing leg is preferably not rigidly mounted to the elongated portion of the elongated member and is preferably designed to be movable between a locked and unlocked position. The securing leg can take on many different shapes and forms. One preferable shape for the securing leg is a "L-shaped" securing leg which has a circular cross sectional shape. If a L-shaped securing leg is used, the securing leg is preferably attached to the elongated portion such that a portion of the L-shaped leg has a longitudinal axis which is substantially perpendicular to the longitudinal axis of the elongated portion and that another portion of the L-shaped securing leg has a longitudinal axis which is substantially parallel to the longitudinal axis of the elongated portion. The securing leg is designed to engage and/or at least partially surround a portion of the steering wheel such as the steering wheel rim to thereby secure the security device to the steering wheel. If the elongated member is movable, the securing leg preferably secures the security device to the steering wheel when the elongated member is positioned in the extended position. If the face plate includes a flange, the securing leg preferably engages and/or move into at least close proximity to the flange when the securing leg is moved into a position to secure the security device to the steering wheel. If the elongated member is movable and the face plate includes a flange, a portion of the securing leg preferably engages the flange and secures the security device to the steering wheel when the elongated member is positioned in the extended position. If the securing leg is designed to engage the flange on the face plate, the flange preferably includes a leg slot adapted to at least partially receive the securing leg. The leg slot is preferably designed to ensure that the securing leg is properly positioned when the securing leg is moved into engagement with the flange. The leg slot is also preferably designed to limit access to and protect the securing leg when the security device is secured to the steering wheel. Preferably, the leg slot surrounds at least a portion of the securing leg. The securing leg is preferably made of the cut resistant metallic material such as steel, steel alloys or other metal alloy. The metallic material may be hardened to further resist cutting.

In accordance with yet another aspect of the present invention, the face plate and elongated member include an arrangement for securing the elongated member in position relative to the face plate. In one preferred arrangement, the elongated member includes an opening adapted to receive a lock member to secure the elongated member in position. The opening may be a recessed region in the elongated member, a region that telescopically receives the lock member and/or a hole through the elongated member. Preferably, the opening is positioned on the elongated portion of the elongated member. In addition, the opening is preferably positioned on the elongated member so that it can receive the lock member when the elongated member is positioned in the extended position. In one preferred design, the opening is a substantially circular hole through the elongated portion of the elongated member. The face plate preferably includes a lock having a lock member adapted to engage the opening in the elongated member. The key hole or combination to the lock is preferably is accessible from the top surface of the face plate; however, the location of the key hole or combination may be placed in other areas so long as they are accessible to the operator to enable the operator to lock and unlock the lock. In one preferred lock arrangement, the lock includes a lock member, such as a cylindrical pin, that is movable in a plane substantially perpendicular to the face plate plane and engages a circular opening in the elongated portion of the elongated member when the elongated member is in the extended position.

In accordance with still yet another aspect of the present invention, the security device includes an end opening which is adapted to allow at least a portion of the elongated member to move beyond the outer peripheral edge of the face plate. The end opening is preferably positioned substantially at the outer peripheral edge of the face plate between the face plate and the face plate flange; however, the end opening may be positioned in other areas such as in the face plate flange, above the face plate flange or on the top surface of the face plate. The end opening is preferably designed to have a cross sectional shape which is substantially similar to the cross sectional shape of the elongated portion of the elongated member so as to allow the elongated member to pass through the opening, but to also limit the access in the end opening.

In accordance with another aspect of the present invention, the security device is shaped to accommodate steering wheels which include airbag components which protrude from the face of the steering wheel.

In accordance with yet another aspect of the present invention, the face plate is rigidified to resist bending of the face plate. Rigidification is preferably obtained by hardening material of the plate sections, re-enforcing the face of each plate section and/or corrugating the plate sections.

The principal object of the present invention is to provide a security device which protects a motor vehicle against theft.

Another object of the present invention is to provide a vehicle steering wheel device which is economical and convenient to use.

Yet another object of the present invention is to provide a vehicle security device which protects the steering wheel from vandalism and unwanted theft.

Still another object of the present invention is to provide a steering wheel security device which limits the access to the steering wheel rim of the steering wheel to prevent cutting or severing of the rim.

Yet another object of the present invention is to provide a steering wheel security device having a flange which further limits access to the steering wheel rim.

Another object of the present invention is to provide a steering wheel and security device which prevents rotation of the steering wheel.

Still yet another object of the present invention is to provide a steering wheel device which can protect all types and shapes of steering wheels.

Another object of the present invention is to provide a vehicle security device which prevents the removal of airbags from the steering wheel.

Yet another object of the present invention is to provide a vehicle security device which can be easily and conveniently stored when not in use.

Still yet another object of the present invention is to provide a vehicle security device that does not have multiple removable components.

BRIEF DESCRIPTION OF THE DRAWINGS

The foregoing and other objects of the invention will become apparent from the following description of the preferred embodiments thereof taken together with the accompanying drawings in which.

PREFERRED EMBODIMENTS OF THE INVENTION

Figure 1:
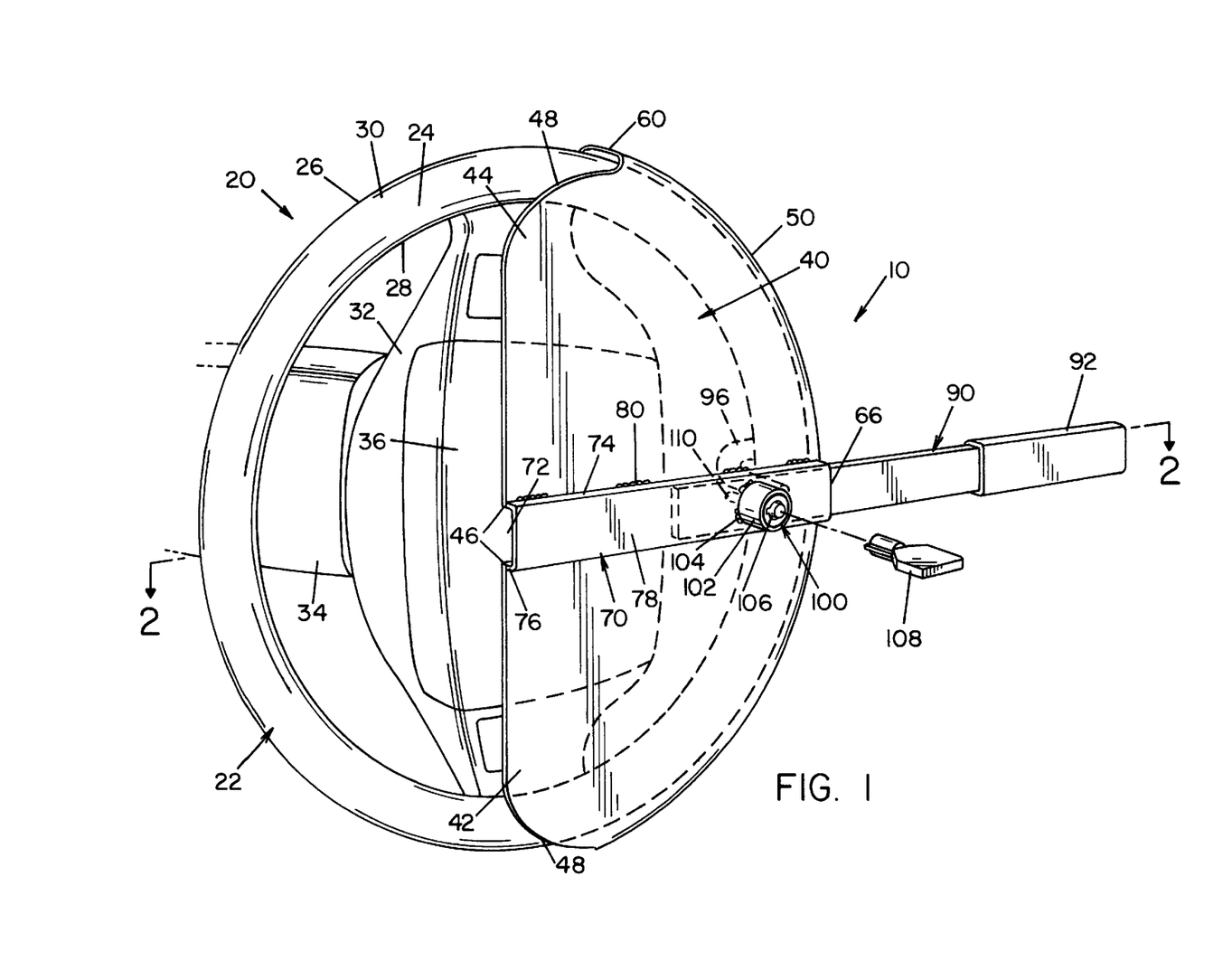
FIG. 1 is a perspective view of a security device connected to a steering wheel in accordance with the present invention.

Referring now to the preferred embodiment of the invention, wherein the showings are only for the purposes of illustrating the preferred embodiments and not for purposes of limiting the same, FIG. 1 illustrates a security device 10 which is designed to limit access to steering wheel 20. Steering wheel 20 includes a steering wheel rim 22 connected to hub 32 by steering wheel column 34. Steering wheel rim 22 includes a front face 24, a back face 26, an inner edge 28 and an outer edge 30. Steering wheel rim is preferably circular in shape and the inner edge 28 defines an inner radius of the steering wheel rim and outer edge 30 defines an outer radius of steering wheel rim 22.

However, the steering wheel rim may be of shapes other than circular. The outer radius of steering wheel rim 22 is preferably about 15 to 18 inches, wherein such radial dimensions encompasses most domestic and foreign steering wheel configurations. The steering wheel hub 32 includes an airbag cover 36 for covering an airbag for protection of the driver during sudden stops of the vehicle. Hub 32 may also include other steering wheel components such as cruise control component, audio components, etc. Security device 10 includes face plate 40. Face plate 40 is designed to be positioned on front face 24 of steering wheel rim 22 to limit access to the rim by an unauthorized user. Face plate 40 is preferably made of a cut resistant material such as carbon steel or stainless steel to make it difficult, if not impossible, for an unauthorized user to cut the face plate and gain access to steering wheel rim 22. However, other cut resistant materials can be used to form the face plate.

The face plate includes a leg 42 and a leg 44, each leg having a first end 46 and second end 48. The angle formed between the two legs is preferably about 180°; however, the angle can range from zero to greater than 180°. The angle is preferably selected to cover at least about 25% of the front face of the steering wheel. As shown in FIG. 1, the angle is about 180° so that face plate 40 covers about 50% of the front face of the steering wheel. The face plate also includes a peripheral edge 50 which is connected between the second end 48 of legs 42, 44. Peripheral edge 50 preferably defines a curvilinear surface between legs 42 and 44. The radius of curvature of peripheral edge 50 is preferably equal to or greater than the radius of curvature of inner edge 28 of steering wheel rim 22. Such a radius size for peripheral edge 50 enables the peripheral edge to protect at least inner edge 28 of the rim when the face plate is connected to steering wheel 20. Second leg 48 has a rounded edge to eliminate a sharp edge between leg 42, 44 and peripheral edge 50 as shown in FIG. 1.

Face plate section may include at least one corrugated surface, not shown. The corrugated surface rigidifies the face plate to make the cutting and/or bending of the plate section increasingly difficult, if not impossible. The corrugated surface may also provide for a design on the face plate section to make the face plate more aesthetically pleasing. The corrugated surface is preferably positioned adjacent to the two legs of the face plate to maximize the rigification effect from the corrugated surface.

Face plate section 42 includes flange 60. The flange is designed to provide additional protection to steering wheel rim 22 when face plate 40 is positioned on the steering wheel. The flange is designed to extend outwardly from peripheral edge 50 of face plate 40. Preferably, the flange is curvilinear in shape so as to be positioned about outer edge 30 of steering wheel rim 22 when the face plate is positioned on the steering wheel rim to further limit access to the steering wheel rim by an unauthorized user. The flange is preferably connected along the complete peripheral edge 50 of face plate 40; however, the flange may be selectively positioned along the peripheral edge 50, if desired. The flange may also be designed to extend about the back face of the steering wheel rim to provide additional protection to the steering wheel rim. The flange is also designed to assist in securing face plate 40 to the steering wheel as will be described more fully below. The flange may also include a flange tab 62. The flange tab is an extension of flange 60 to increase the difficulty of access to steering wheel rim 22 when security device 10 is connected to steering wheel rim 22. Flange tab 62 may also be designed to also extend partially about the inner edge of steering wheel rim 22.

Referring to FIG. 1, face plate 40 includes a guide 70 for guiding elongated member 90 between a collapsed unlocked position and an open locked position as will be described in detail below. Guide 70 includes a slot 72 positioned between the two first leg ends 46. Slot 72 extends from legs 42, 44 to peripheral edge 50. Slot 72 includes two side walls 74, 76 which extend upwardly from the top of face plate 40. Preferably side walls 74, 76 are parallel to one another and extend substantially perpendicular to the top plane of face plate 40. Slot 72 includes a base 78 which is connected between sidewalls 74, 76. Base 78 is positioned so as to be in a plane substantially to the top plane of face plate 40. The sidewalls and base of slot 72 may be welded together or can be a single piece. Preferably, the slot components are a single piece of cut resistant material, which material is preferably the same material used to form face plate 40. Slot 72 is welded to face plate 40 by weld bead 80. As can be appreciated, slot 72 can be connected to face plate 40 in other manners or could be formed on face plate 40, thereby eliminating the need to connect slot 72 to face plate 40.

The width of slot 72 is selected so that elongated member can move within slot 72. Preferably, elongated member 90 has a substantially cross-sectional rectangular shape. The depth of slot 72 is selected so that the back of elongated member 90 is flush with or spaced from the back surface of face plate 40. Such an arrangement allows the elongated member to move freely while face plate 40 is attached to the steering wheel.

Figure 4:
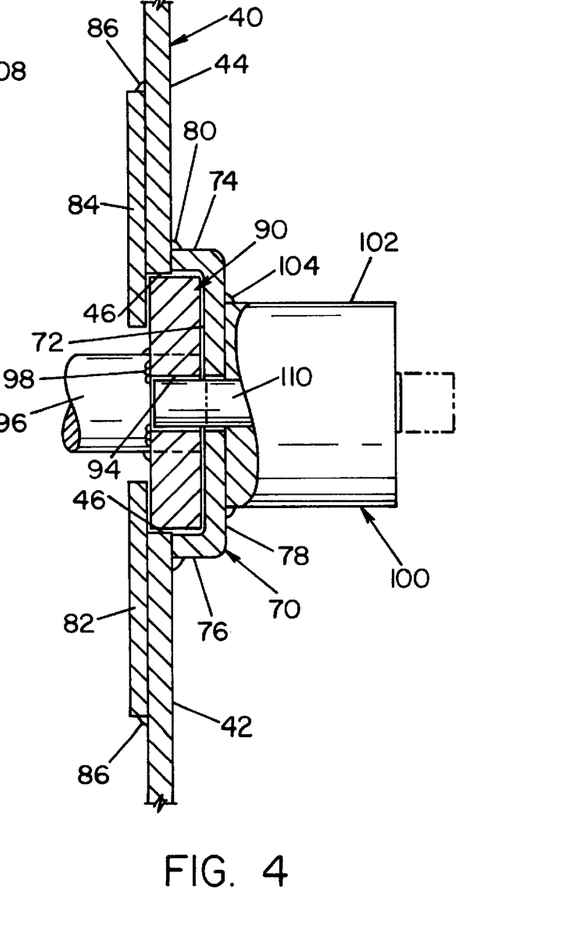
FIG. 4 is an enlarged view of the locking mechanism as shown in FIG. 3.
Figure 5:
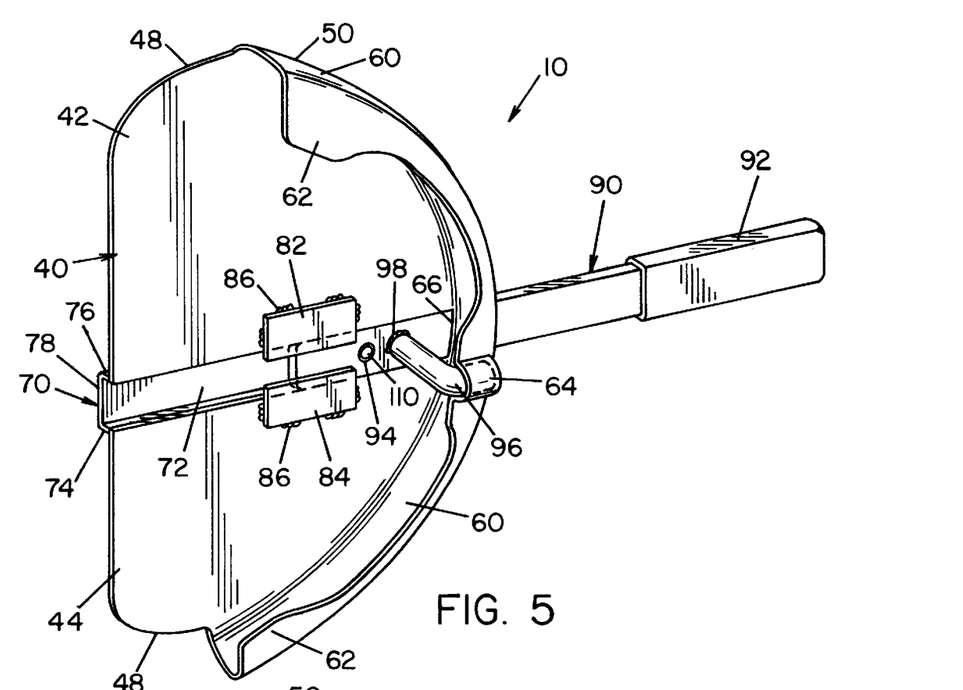
FIG. 5 is a rear perspective view of the security device shown in the open locked position.
Figure 6:
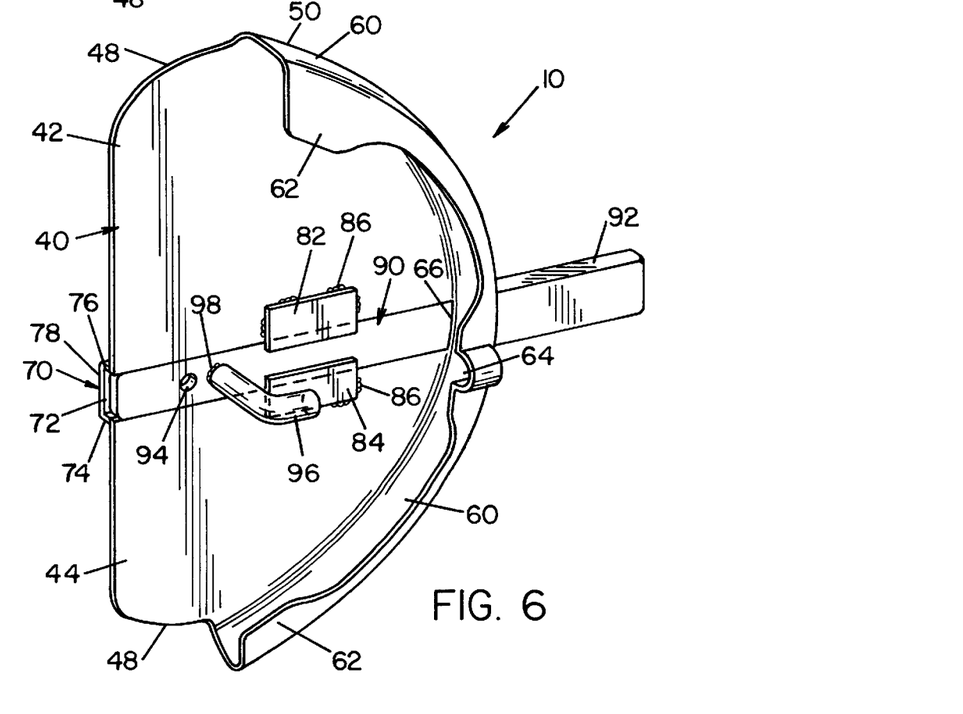
FIG. 6 is a view similar to FIG. 5 of the security device shown in the collapsed unlocked position.

Referring now to FIGS. 4–6, guide 70 includes two slot flanges 82, 84. Each slot flange is secured to the back surface of face plate 40. The slot flanges are welded to face plate 40 by weld bead 86; however, as can be appreciated, other arrangements can be used to attach slot flanges 82, 84 to face plate 40. Each slot flange is mounted so that at least a portion of the slot flange overlies slot 72. Such arrangement secures elongated member 90 in slot 72 as shown in FIG. 4.

Figure 2:
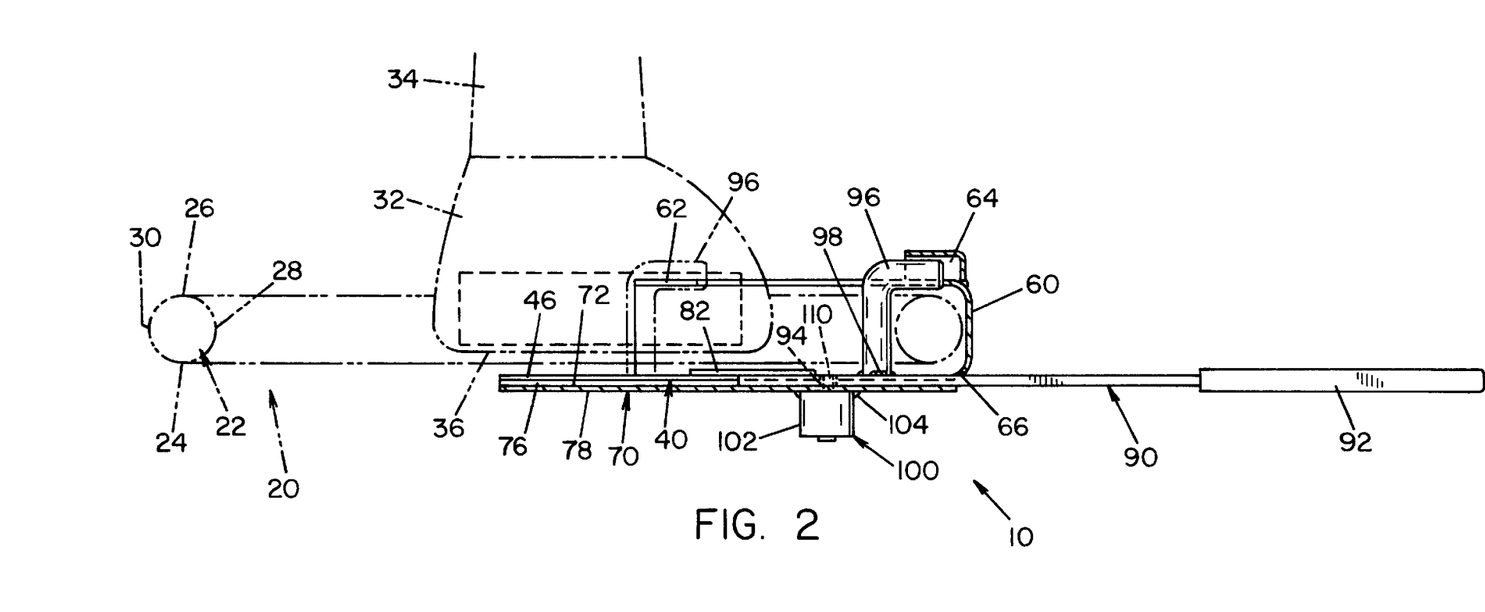
FIG. 2 is a cross-section view along lines 2—2 of FIG. 1.
Figure 3:
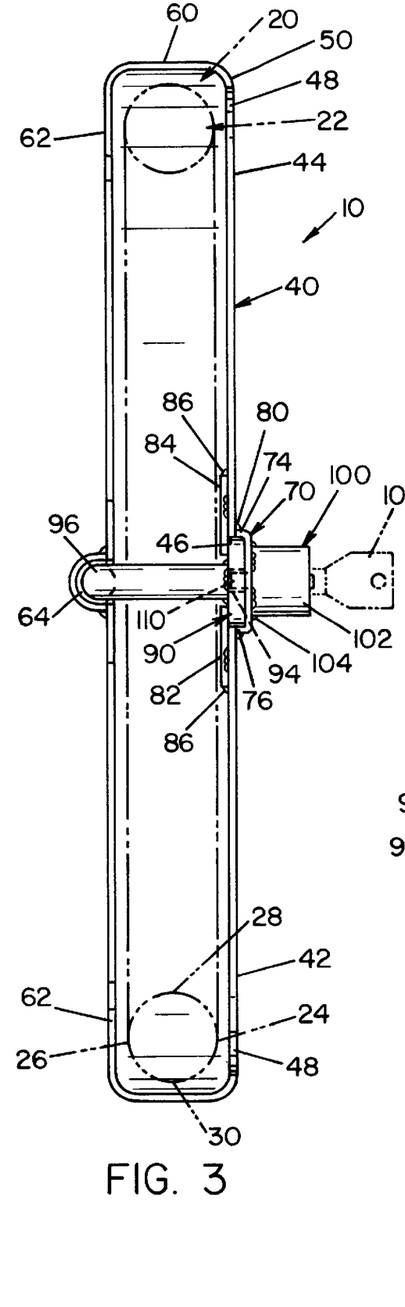
FIG. 3 is a left end view of the invention as shown in FIG. 1.

Referring now to FIG. 2, guide 70 includes an opening 66 to allow elongated member 90 to move between an open and collapsed position. Opening 66 allows the elongated member to move between base 78 and flange 60.

Referring to FIGS. 1 and 4, a lock 100 is provided on security device 10. Lock 100 includes a lock housing 102 secured to slot base 78. Preferably, lock housing is welded to slot base by weld bead 104. Lock 100 includes a key opening 106 for key 108. Key 108 is adapted to move lock pin 110 into and out of engagement with elongated member 90 as will be discussed in more detail below.

Referring now to FIGS. 1, 5 and 6, elongated member 90 includes a handle 92. Preferably, handle 92 includes a rubber or plastic grip to enable a user to easily grasp and move elongated member 90 into an open or collapsed position. Elongated member 90 includes pin hole 94 which is adapted to receive hole pin 110. Pin lock 94 is preferably positioned substantially in the middle of the two sides of elongated member 90. Pin hole 94 can penetrate completely through the elongated member as shown in FIGS. 5 and 6 or only partially through the elongated member. Elongated member 90 also includes hook 96. Hook 96 is an L-shaped member connected to elongated member 90 by weld bead 98. Hook 96 is designed to engage steering wheel rim 22 when elongated member 90 is moved into the open locked position as discussed in detail below.

Referring now to FIGS. 5 and 6, flange 60 includes a hook groove 64. Hook groove 64 is adapted to receive the end of hook 96 when elongated member 90 is moved into the open locked position as is discussed in detail below. Hook groove 64 is adapted to limit the movement of hook 96 when the hook is positioned in groove 64. Hook groove 64 also limits access to hook 96 to prevent or inhibit unauthorized access to the security device and steering wheel.

The operation of the preferred embodiment of the security device will now be described.

Referring now to FIGS. 1, 5 and 6, security device 10 is easily attached and secured to steering wheel 20 by sliding face plate 40 onto the steering wheel 20. As shown in FIG. 1, the steering wheel rim 22 is positioned between the back of face plate 40 and flange 60. Elongated member is positioned in the unlocked collapsed position, as shown in FIG. 6, when the security device is positioned on the steering wheel. Once face plate 40 is properly positioned on the steering wheel, elongated member 90 is moved into the open locked position as shown in FIG. 5. The design of the security device allows the security device to be inserted onto a steering wheel without having to preposition the steering wheel as is required when using the ROBOCAP. The elongated member 90 can be moved into such position by the user grasping handle 92 and pulling the elongated member into the lock position. When elongated member 90 is moved to the lock position, hook 96 moves adjacent to steering wheel rim 22 and passes into hook groove 64. As shown in FIG. 2, steering wheel rim 22 is entrapped between flange 60 and hook 96, thereby securing security device 10 to steering wheel 20. Once elongated member 90 is moved into the open lock position, pin hole 94 is aligned with lock pin 110 of lock 100. Elongated member is secured into the locked position by placing key 108 into key opening 106. Key 108 is then inserted into key opening 106, thereby causing lock pin 110 to move into pin hole 94. Key 108 is then removed, thereby locking elongated member into position. As can be appreciated, the extending of elongated member 90 prevents the steering wheel from being fully rotated due to the elongated member engaging internal components of the vehicle when the steering wheel is rotated. When security device 10 is secured to steering wheel 20, face plate 40 limits access to the steering wheel to inhibit or prevent an unauthorized user from removing components of the steering wheel such as an air bag. In addition, the extended elongated member prevents full rotation of the steering wheel, thus not allowing an unauthorized user from driving the vehicle. The face plate and flange protect the rim to prevent an unauthorized user from cutting the rim and removing the security device.

When the security device is to be removed from the steering wheel, key 108 is inserted into key opening 106 to move lock pin 110 into the retracted unlocked position. Preferably, lock pin 110 is spring biased in the retracted unlocked position so that the lock pin can be easily disengaged from pin hole 96 when key 108 unlocks lock 100. Once lock pin 110 is disengaged from pin hole 96, elongated member is moved into the collapsed open position as shown in FIG. 6. In this position, hook 96 moves away from steering wheel rim 22 as shown in FIG. 2. Such a position allows face plate 40 to be slid from steering wheel rim 22 and lifted off of steering wheel 20. The collapsed security device can then be easily stored for later use. The elongated member is designed so that it cannot be detached from face plate 40 so as to eliminate the possibility of losing unsecured parts and to make the operation of the security device much more simple and convenient.

The invention has been described with reference to a preferred embodiment and alternates thereof. It is believed that many modifications and alterations to the embodiments discussed will readily suggest themselves to those skilled in the art upon reading and understanding the detailed description of the invention. It is intended to include all such modifications and alterations insofar as they come within the scope of the present invention.

I claim:

1. A vehicle security device for protecting a steering wheel rim comprising a steering wheel cover and an elongated member, said steering wheel cover comprising a protective face plate formed of a cut resistant material and designed to overlie at least about 50 percent of a front face of said steering wheel rim, said face plate including a guide and a flange, said flange attached to a peripheral edge of said face plate and adapted to cover at least a part of an outer surface of said steering wheel rim when said face plate is positioned onto said steering wheel rim, said guide adapted to allow said elongated member to move between a retracted position and an extended position, said elongated member adapted to prevent full rotation of said steering wheel when positioned in said extended position, said plate section includes two legs wherein each leg has a first end and a second end and an outer arc of a given radius connected between the first end of each leg to form an outer peripheral edge of each of said plate sections, said outer arc having a given radius at least equal to an outer edge radius of said steering wheel.

2. A device as defined in claim 1, wherein said flange being attached to at least a portion of said outer peripheral edge of said plate section and extending outward from said outer peripheral edge of said plate section.

3. A device as defined in claim 2, wherein said flange being adapted to extend at least partially about a back face of said steering wheel rim when said face plate is positioned on said steering wheel.

4. A device as defined in claim 1, wherein said guide includes a slot adapted to receive at least a portion of said elongated member.

5. A device as defined in claim 3, wherein said guide includes a slot adapted to receive at least a portion of said elongated member.

6. A device as defined in claim 4 wherein said guide includes a flange to retain at least a portion of said elongated member in said guide.

7. A device as defined in claim 5 wherein said guide includes a flange to retain at least a portion of said elongated member in said guide.

8. A device as defined in claim 6, wherein said flange at least partially extends over said slot and at least partially extends along said slot.

9. A device as defined in claim 7, wherein said flange at least partially extends over said slot and at least partially extends along said slot.

10. A vehicle security device for protecting a steering wheel rim comprising a steering wheel cover and an elongated member, said steering wheel cover comprising a protective face plate formed of a cut resistant material and designed to overlie at least about 50 percent of a front face of said steering wheel rim, said face plate including a guide and a flange, said flange attached to a peripheral edge of said face plate and adapted to cover at least a part of an outer surface of said steering wheel rim when said face plate is positioned onto said steering wheel rim, said guide adapted to allow said elongated member to move between a retracted position and an extended position, said elongated member adapted to prevent full rotation of said steering wheel when positioned in said extended position, said guide includes two flange to retain at least a portion of said elongated member in said guide, said flanges at least partially extend over a slot and at least partially extend along the slot, wherein one flange being positioned on one side of said slot and the other flange being positioned on the other side of said slot.

11. A device as defined in claim 9, wherein said guide includes two flanges wherein one flange being positioned on one side of said slot and the other flange being positioned on the other side of said slot.

12. A device as defined in claim 1, wherein said elongate member includes a securing leg adapted to secure said face plate to said steering wheel when said elongated member is positioned in said extended position.

13. A device as defined in claim 8, wherein said elongate member includes a securing leg adapted to secure said face plate to said steering wheel when said elongated member is positioned in said extended position.

14. A device as defined in claim 11, wherein said elongate member includes a securing leg adapted to secure said face plate to said steering wheel when said elongated member is positioned in said extended position.

15. A device as defined in claim 13, wherein said securing leg engages said flange when said elongated member is positioned in said extended position.

16. A device as defined in claim 14, wherein said securing leg engages said flange when said elongated member is positioned in said extended position.

17. A vehicle security device for protecting a steering wheel rim comprising a steering wheel cover and an elongated member, said steering wheel cover comprising a protective face plate formed of a cut resistant material and designed to overlie at least about 50 percent of a front face of said steering wheel rim, said face plate including a guide and a flange, said flange attached to a peripheral edge of said face plate and adapted to cover at least a part of an outer surface of said steering wheel rim when said face plate is positioned onto said steering wheel rim, said guide adapted to allow said elongated member to move between a retracted position and an extended position, said elongated member adapted to prevent full rotation of said steering wheel when positioned in said extended position, said elongate member includes a securing leg adapted to secure said face plate to said steering wheel when said elongated member is positioned in said extended position, said securing leg engages said flange when said elongated member is positioned in said extended position, said flange includes a leg slot adapted to at least partially receive said leg when said elongated member is positioned in said extended position.

18. A device as defined in claim 15, wherein said flange includes a leg slot adapted to at least partially receive said leg when said elongated member is positioned in said extended position.

19. A device as defined in claim 16, wherein said flange includes a leg slot adapted to at least partially receive said leg when said elongated member is positioned in said extended position.

20. A device as defined in claim 1, wherein said elongated member includes an opening adapted to receive a member to secure said elongated member in position.

21. A device as defined in claim 18, wherein said elongated member includes an opening adapted to receive a member to secure said elongated member in position.

22. A device as defined in claim 19, wherein said elongated member includes an opening adapted to receive a member to secure said elongated member in position.

23. A device as defined in claim 22, wherein said face plate includes a lock having a member to secure said elongated member .

24. A vehicle security device adapted to limit access to a steering wheel which steering wheel includes a rim having a front face, a back face, an inner edge, an inner edge radius, and an outer edge, said security device comprising a cut resistant plate lying in a plate plane and an elongated member, said face plate including two legs, a flange and a guide, each of said legs having a first end and a second end and an outer arc of a given radius connected between the first end of each leg to form an outer peripheral edge of said face plate, said outer arc having a given radius at least equal to said outer edge radius of said steering wheel, said flange being attached to at least a portion of said outer peripheral edge of said face plate and adapted to cover at least a portion of an outer surface of said steering wheel rim when said face plate is positioned onto said steering wheel rim, said guide adapted to allow said elongated member to move between a retracted position and an extended position, said elongated member adapted to prevent full rotation of said steering wheel when positioned in said extended position, said guide including a slot and a guide flange, said slot lying in a plane substantially parallel to said plate plane and being adapted to receive at least a portion of said elongated member, said guide flange at least partially extends over said slot and being adapted to retain at least a portion of said elongated member in said slot.

25. A device as defined in claim 24, wherein said flange being adapted to extend at least partially about a back face of said steering wheel rim when said face plate is positioned on said steering wheel.

26. A device as defined in claim 24, wherein said flange at least partially extends along said slot.

27. A device as defined in claim 25, wherein said flange at least partially extends along said.

28. A device as defined in claim 24, wherein said guide includes two flanges wherein one flange being positioned on one side of said slot and the other flange being positioned on the other side of said slot.

29. A device as defined in claim 27, wherein said guide includes two flanges wherein one flange being positioned on one side of said slot and the other flange being positioned on the other side of said slot.

30. A device as defined in claim 24, wherein said elongate member includes a securing leg adapted to secure said face plate to said steering wheel when said elongated member is positioned in said extended position, said securing leg engaging said flange when said elongated member is positioned in said extended position.

31. A device as defined in claim 29, wherein said elongate member includes a securing leg adapted to secure said face plate to said steering wheel when said elongated member is positioned in said extended position, said securing leg engaging said flange when said elongated member is positioned in said extended position.

32. A device as defined in claim 30, wherein said flange includes a leg slot adapted to at least partially receive said securing leg when said elongated member is positioned in said extended position.

33. A device as defined in claim 31, wherein said flange includes a leg slot adapted to at least partially receive said securing leg when said elongated member is positioned in said extended position.

34. A device as defined in claim 24, wherein said face plate includes a lock having a lock member movably engagable to secure said elongated member in said extended position, said elongated member including an opening adapted to receive said lock member.

35. A device as defined in claim 33, wherein said face plate includes a lock having a lock member movably engagable to secure said elongated member in said extended position, said elongated member including an opening adapted to receive said lock member.

36. A device as defined in claim 25, wherein said lock member movable in a plane substantially perpendicular to said plate plane.

37. A device as defined in claim 24, wherein said elongated member being slidably engagable with said guide.

38. A device as defined in claim 36, wherein said elongated member being slidably engagable with said guide.

39. A device as defined in claim 24, including a end opening positioned at least substantially adjacent to said outer peripheral edge of said face place, said end opening adapted to allow at least a portion of said elongated member to move beyond said outer peripheral edge of said face plate.

40. A device as defined in claim 38, including a end opening positioned at least substantially adjacent to said outer peripheral edge of said face place, said end opening adapted to allow at least a portion of said elongated member to move beyond said outer peripheral edge of said face plate.

41. A device as defined in claim 34, wherein said end opening is positioned above said flange.

42. A device as defined in claim 40, wherein said end opening is positioned above said flange.

43. A vehicle security device for protecting a steering wheel rim comprising a steering wheel cover and an elongated member, said steering wheel cover comprising a protective face plate formed of a cut resistant material and designed to overlie at least about 50 percent of a front face of said steering wheel rim, said face plate including two legs and a guide, each of said legs having a first end and a second end and an outer arc of a given radius connected between the first end of each leg to form an outer peripheral edge of said face plate, said guide positioned between said first end of said first and second legs, said guide adapted to allow said elongated member to move between a retracted position and an extended position, said elongated member adapted to prevent full rotation of said steering wheel when positioned in said extended position.

44. A device as defined in claim 43, wherein said face plate includes a flange attached to at least a portion of said outer peripheral edge of said face plate and adapted to cover at least a portion of an outer surface of said steering wheel rim when said face plate is positioned onto said steering wheel rim.

45. A device as defined in claim 44, wherein said flange extends outwardly from said outer peripheral edge of said plate section.

46. A device as defined in claim 43, wherein said flange is adapted to extend at least partially about a back face of said steering wheel rim when said face plate is positioned on said steering wheel.

47. A device as defined in claim 43, wherein said guide is positioned at substantially equal distances from the first end of said first and second legs.

48. A device as defined in claim 43, wherein said guide includes a slot adapted to receive at least a portion of said elongated member.

49. A device as defined in claim 43, wherein said slot lies in a plane substantially parallel to said plate plane.

50. A device as defined in claim 48, wherein said guide includes guide flange adapted to retain at least a portion of said elongated member in said slot.

51. A device as defined in claim 50, wherein said flange at least partially extends over said slot and at least partially extends along said slot.

52. A device as defined in claim 48, wherein said guide includes two guide flanges wherein one guide flange is positioned on one side of said slot and the other guide flange is positioned on the other side of said slot.

53. A device as defined in claim 43, wherein said outer arc has a given radius at least equal to an outer edge radius of said steering wheel.

54. A device as defined in claim 43, wherein said elongate member includes a securing leg adapted to secure said face plate to said steering wheel when said elongated member is positioned in said extended position.

55. A device as defined in claim 44, wherein said elongate member includes a securing leg adapted to secure said face plate to said steering wheel when said elongated member is positioned in said extended position.

56. A device as defined in claim 55, wherein said securing leg engages said flange when said elongated member is positioned in said extended position.

57. A device as defined in claim 55, wherein said flange includes a leg slot adapted to at least partially receive said leg when said elongated member is positioned in said extended position.

58. A device as defined in claim 43, wherein said elongated member includes an opening adapted to receive a member to secure said elongated member in position.

59. A device as defined in claim 43, wherein said face plate includes a lock having a member to secure said elongated member.

60. A device as defined in claim 59, wherein said lock has a lock member movably engagable to secure said elongated member in said extended position, said elongated member including an opening adapted to receive said lock member.

61. A device as defined in claim 60, wherein said lock member is movable in a plane substantially perpendicular to said plate plane.

62. A device as defined in claim 43, including a end opening positioned at least substantially adjacent to said outer peripheral edge of said face place, said end opening adapted to allow at least a portion of said elongated member to move beyond said outer peripheral edge of said face plate.

63. A device as defined in claim 44, including a end opening positioned at least substantially adjacent to said outer peripheral edge of said face place, said end opening adapted to allow at least a portion of said elongated member to move beyond said outer peripheral edge of said face plate.

64. A device as defined in claim 63, wherein said end opening is positioned above said flange.

* * * * *